(12) United States Patent
Parady

(10) Patent No.: US 6,890,582 B2
(45) Date of Patent: May 10, 2005

(54) AERATED AND GRAINED SUGAR-FREE BOILED SWEET

(75) Inventor: Tom Parady, Hancock, IL (US)

(73) Assignee: Roquette Freres, Lestrem (FR)

( * ) Notice: Subject to any disclaimer, the term of this patent is extended or adjusted under 35 U.S.C. 154(b) by 297 days.

(21) Appl. No.: 10/164,272

(22) Filed: Jun. 5, 2002

(65) Prior Publication Data

US 2003/0008052 A1 Jan. 9, 2003

(30) Foreign Application Priority Data

Jun. 11, 2001 (FR) .............................. 01 07612

(51) Int. Cl.⁷ ................................ A23G 3/00
(52) U.S. Cl. ....................... 426/660; 426/548; 426/572; 426/658
(58) Field of Search ................. 426/660, 548, 426/572, 658

(56) References Cited

U.S. PATENT DOCUMENTS

| | | | |
|---|---|---|---|
| 4,597,981 A | * | 7/1986 | Kastin ...................... 426/660 |
| 4,774,100 A | * | 9/1988 | Markwardt et al. ......... 426/572 |
| 4,840,797 A | | 6/1989 | Boursier |
| 5,236,719 A | | 8/1993 | Meyers et al. |
| 5,314,701 A | | 5/1994 | Mentink et al. |
| 5,462,760 A | | 10/1995 | Serpelloni et al. |
| 5,470,591 A | * | 11/1995 | Ribadeau-Dumas et al. ... 426/3 |
| 5,478,593 A | | 12/1995 | Serpelloni et al. |
| 5,527,542 A | | 6/1996 | Serpelloni et al. |
| 5,580,601 A | | 12/1996 | Ribadeau-Dumas et al. |
| 5,601,866 A | | 2/1997 | Serpelloni et al. |
| 5,629,042 A | * | 5/1997 | Serpelloni et al. .......... 426/660 |
| 5,637,344 A | | 6/1997 | Carpenter et al. |
| 5,900,261 A | | 5/1999 | Ribadeau-Dumas et al. |

FOREIGN PATENT DOCUMENTS

| | | |
|---|---|---|
| EP | 0 303 295 | 2/1989 |
| WO | 01/10236 | 2/2001 |

OTHER PUBLICATIONS

Derwent Abstract of EP 1 006 128.

* cited by examiner

Primary Examiner—N. Bhat
(74) Attorney, Agent, or Firm—Sturm & Fix LLP

(57) ABSTRACT

A process for manufacturing aerated and grained sugar-free boiled sweets comprises the steps consisting of boiling a syrup comprising, relative to the dry mater content, at least 60% by weight of a hydrogenated disaccharide so as to obtain a massecuite; beating the massecuite until cooling below the melting point of the hydrogenated disaccharide is obtained; working the resulting mass and aerating the mass; forming the aerated mass and allowing it to harden so as to obtain an aerated boiled sweet; and carrying out a forced graining in a moist medium so as to obtain an aerated grained sugar-free boiled sweet. Further includes is providing aerated grained sugar-free boiled sweet, wherein the sweetening dry matter content comprises at least 60% by weight of a hydrogenated disaccharide.

25 Claims, No Drawings

AERATED AND GRAINED SUGAR-FREE BOILED SWEET

FIELD OF THE INVENTION

The subject of the present invention is a process for preparing an aerated and grained sugar-free boiled sweet. Its subject is also a novel aerated and grained sugar-free boiled sweet.

The expression <<aerated and grained boiled sweet>> is understood to mean for the purposes of the present invention a very particular class of boiled sweets which have as main characteristic that of being essentially practically crystallized, nontransparent and nonsticky, and having a hard, but relatively tender and brittle, texture which is novel and unusual for boiled sweets. This type of confectionery products, developed especially for the American market, are generally denoted in the United States by the term <<mints>> or <<after-dinner mints>> because they are often strongly flavoured with mint. However, these confectionery products are always essentially formulated with sucrose, which is generally boiled in the presence of a small quantity of sodium tartrate or a small quantity of glucose syrup in order to obtain grained boiled sweets.

BACKGROUND OF THE INVENTION

Boiled sweets for the purposes of the present invention should be distinguished from aerated and grained confectionery products as described in Patent EP-B1-630 573, of which the assignee is proprietor, which consist of marshmallows, caramels, chewy pastes and other tender confectionery products to which the present invention is not attached.

The boiled sweets according to the present invention are characterized by their essentially crystalline state and by a short and crunchy, more or less tender and more or less brittle, texture.

Nowadays, as regards confectionery products and sweetmeats, it appears that new consumer trends are appearing. Notions of nutritional balance and healthy lifestyle are, consciously or otherwise, taken into account in current diets. Although the enjoyment of what is sweet is still very strong, a good number of consumers wish to avoid the problems linked to the consumption of sugars. It is for this reason that confectionery manufacturers have been led to develop sugar-free formulations in which polyols are rightly used because of their harmlessness towards the teeth and of their reduced calorific value compared with sucrose.

One of the great difficulties from which formulators of sugar-free confectionery products cannot escape is that of successfully manufacturing products which are in every respect similar to traditional products to the extent that it is difficult to tell them apart, this being without having to substantially alter or complicate the plants and the procedures in place in industries.

To the knowledge of the inventors, there are currently no technically and economically viable processes allowing the manufacture of aerated and grained sugar-free boiled sweets according to the invention, having the taste characteristics set out above. On the strength of this acknowledged fact, the inventors set out to remedy this deficiency.

OBJECTS AND SUMMARY OF THE INVENTION

It is after many trials that the inventors have had the merit of finding, surprisingly and unexpectedly, that aerated and grained boiled sweets of excellent quality and which are stable over time could be produced according to a particular process.

The subject of the present invention is therefore a process for manufacturing aerated and grained sugar-free boiled sweets, wherein it comprises the steps consisting in:

boiling a syrup comprising at least 60% by weight of a hydrogenated disaccharide so as to obtain a massecuite, beating the said massecuite until cooling below the melting point of the said hydrogenated disaccharide is obtained, working the resulting mass and aerating it, forming the aerated mass and allowing it to harden so as to obtain an aerated boiled sweet, carrying out a forced graining in a moist medium so as to obtain an aerated grained sugar-free boiled sweet.

According to the invention, it is essential that the total sweetening mass of the boiled sweet, predominantly provided by the said syrup, consists of at least one predominant hydrogenated disaccharide, that is to say in an amount of at least 60% by weight of the dry matter content of the said syrup. The inventors haves indeed found that, below a content of 60%, it is not possible to produce boiled sweets according to the invention, as will be exemplified elsewhere.

MORE DETAILED DESCRIPTION

In practice, it is preferable that this hydrogenated disaccharide is present in an amount of at least 70% by weight of the dry matter content of the said syrup. This hydrogenated disaccharide may be advantageously chosen from the group consisting of maltitol, lactitol, isomalt, alone or in the form of a mixture with each other.

It is possible to add to this syrup any ingredient capable of entering into the composition of the boiled sweets, such as in particular flavourings, colourings, acidulants, intense sweeteners, active ingredients, and minerals such as calcium and magnesium in particular.

Preferably, the boiling of the syrup is carried out at a temperature of between 160° C. and 200° C. at atmospheric pressure, or at a temperature of between 140 and 160° C. under vacuum. The exact boiling temperature will vary according to the type of evaporator in place and in particular the level of vacuum applied.

The cooling and aeration of the massecuite are then carried out below the melting point of the said predominant hydrogenated disaccharide by beating this mass at high speed, for example in a planetary mixer or a beater under air pressure.

According to a variant of the process according to the invention, the crystallization of the massecuite can then be initiated by adding to the cooled massecuite a powdered hydrogenated disaccharide corresponding to the predominant hydrogenated disaccharide initially introduced. As a guide, a maltitol powder will be added to a syrup whose dry matter content comprises at least 60%, preferably at least 70% maltitol, or a lactitol powder will be added to a syrup whose dry matter content comprises at least 60%, preferably at least 70% lactitol.

Preferably, the said powder has a fine particle size distribution, that is to say a mean diameter of less than 100 micrometers. This addition preferably represents 0.1 to 3% by weight of the total dry matter.

The massecuite is then worked with the aim of allowing the propagation of the crystallization and also to allow it to be aerated. A pulling device or a device for producing overrun under pressure is used for this purpose, for example, and the work is carried out at a suitable temperature such that the viscosity of the mass is right. The said mass indeed has to be sufficiently viscous to be able to pull it.

The cooled and aerated massecuite is then formed, for example, by moulding, forming or pressing followed by cutting. The articles obtained are then allowed to harden and a forced graining is carried out in a humid medium, for example by exposing them to an atmosphere at 80% relative humidity and 37° C. for 1 to 4 days. The aim of this operation is to complete the crystallization of the boiled sweets and thus to dispense with problems of sticking of the boiled sweets to each other if they are marketed without individual wrappings.

Aerated and grained sugar-free boiled sweets are then obtained which are practically essentially crystallized, nonsticky, white in appearance and have a short and brittle texture.

According to the invention, the constituent sweetening mass of the said boiled sweets will contain, in addition to the predominant hydrogenated disaccharide, polyol syrups or hydrogenated oligosaccharide or polysaccharide syrups, hydrogenated or nonhydrogenated branched maltodextrins such as those described in Patent Application EP-A1-1 006 128, of which the assignee is proprietor, polydextrose or alternatively fructo- or galacto-oligosaccharides. It will be possible, for example, without this being essential, to add to the initial syrup, before boiling, maltitol syrups, such as in particular LYCASIN®HBC marketed by the assignee, in order to improve the stability of the final boiled sweets. Good results were obtained by incorporating into the dry matter content of the initial syrup, before boiling, 10, 20 or 30% of dry matter content of such a maltitol syrup.

According to a variant of the invention, the dry matter content of the initial syrup may also comprise up to 7% by weight of at least one low molecular weight polyol, such as in particular xylitol, erythritol or mannitol, alone or in the form of a mixture with each other. Above this content, the hygroscopicity of the boiled sweets according to the invention becomes too high.

According to another variant of the invention, the aerated and grained boiled sweets obtained may be, in addition, coated using any technique known to persons skilled in the art. It would be possible, by way of example, and according to the type of sugar-coated boiled sweets desired, to use one of the processes described in Patents EP-B1-201412, EP-B1-625311 or alternatively in Patent Application EP-A1-774210, of which the assignee is proprietor.

The subject of the invention is also a novel aerated and grained sugar-free boiled sweet. More precisely, the subject of the invention is an aerated and grained sugar-free boiled sweet, wherein its sweetening dry matter content comprises at least 60%, preferably at least 70% by weight of a hydrogenated disaccharide.

Preferably, the said hydrogenated disaccharide is chosen from the group consisting of maltitol, lactitol, isomalt, alone or in the form of a mixture with each other.

To the knowledge of the inventors, such sugar-free boiled sweets constitute novel industrial products.

According to a variant of the invention, the sweetening dry matter content of the said boiled sweet may comprise, in addition, up to 7% by weight of at least one polyol chosen from the group consisting of mannitol, xylitol, erythritol, alone or in the form of a mixture with each other.

According to another variant of the invention, the sweetening dry matter content of the said boiled sweet comprises, in addition, one or more polyol, hydrogenated polysaccharide or hydrogenated oligosaccharide syrups, such as in particular maltitol syrups such as LYCASIN®HBC marketed by the assignee, hydrogenated or nonhydrogenated branched maltodextrins such as those described in Patent Application EP-A1-1 006 128, of which the assignee is proprietor, polydextrose, or alternatively fructo- or galacto-oligosaccharides. Very good results were in particular obtained when the sweetening dry matter content of the said boiled sweets comprises in addition up to 50% dry matter content of a maltitol syrup such as LYCASIN®HBC.

The boiled sweets in accordance with the invention may of course comprise other ingredients such as flavourings, acidulants, colourings, intense sweeteners, active ingredients, minerals such as in particular calcium or magnesium.

As regards the water content of the boiled sweets according to the invention, it is generally between 0.5 and 10%, preferably between 1 and 5%.

The boiled sweets in accordance with the invention may in addition contain a sugar-free crystalline coating obtained by coating according to any technique known to persons skilled in the art.

The invention will be understood more clearly on reading the examples which follow, which are intended to be illustrative and nonlimiting.

EXAMPLE 1

The behaviour of various polyols is compared using various syrup formulations containing about 75% dry matter content, from which there are prepared, according to the same process, boiled sweets according to the invention.

| Composition of the dry matter content of the syrup at 75% DM (% by dry weight) | A | B | C | D | E | F | G | H | I |
|---|---|---|---|---|---|---|---|---|---|
| Maltitol (dry) | 100 | 80 | 95 | 76 | 40 | 0 | 90 | 0 | 0 |
| Xylitol (dry) | 0 | 0 | 5 | 5 | 0 | 100 | 10 | 0 | 0 |
| Mannitol (dry) | 0 | 0 | 0 | 0 | 0 | 0 | 0 | 50 | 15 |
| LYCASIN ® HBC (dry) | 0 | 20 | 0 | 19 | 60 | 0 | 0 | 50 | 85 |

To prepare boiled sweets according to the invention, the following process is used for all the formulas:
- the syrup is boiled at 190° C. at atmospheric pressure,
- the massecuite obtained is cooled until the temperature is less than 140° C.,
- there added 2% by weight, relative to the dry matter content of the syrup, of a polyol powder (seed crystal) corresponding to the predominant polyol of the syrup (maltitol, xylitol) and the flavourings (0.1 to 2% by weight of the sweetening dry matter content of the syrup) and the beating is continued,
- the aerated mass is pulled for 5 minutes on a pulling device,
- the mass obtained is formed and allowed to harden,
- a forced graining is carried out by placing the formed boiled sweets at 37° C. and 80% relative humidity for 1 to 4 days.

Results: formulas A to D give excellent results.
Formula E gives sticky, nongrained boiled sweets.
Formula F gives a massecuite which remains liquid.
Formula G remains in the liquid state after maturation.
Formula H gives a nonworkable massecuite which crystallizes on cooling.

Formula I gives sticky boiled sweets which become liquid after maturation.

What is claimed is:

1. A process for manufacturing aerated and grained sugar-free boiled sweets, wherein it comprises the steps consisting in:
- boiling a syrup comprising, relative to the dry matter content, at least 60%, by weight of a hydrogenated disaccharide so as to obtain a massecuite,
- beating the said massecuite until cooling below the melting point of the hydrogenated disaccharide is obtained,
- working the resulting mass and aerating it,
- forming the said aerated mass and allowing it to harden so as to obtain an aerated boiled sweet,
- carrying out a forced graining in a moist medium so as to obtain an aerated grained sugar-free boiled sweet.

2. The process according to claim 1, wherein the said hydrogenated disaccharide is selected from the group consisting of maltitol, lactitol, isomalt, alone or in the form of mixtures with each other.

3. The process according to claim 1, wherein the said syrup comprises, in addition, up to 7% by weight relative to the dry matter content of at least one polyol selected from the group consisting of mannitol, xylitol, erythritol, alone or in the form of a mixture with each other.

4. The process according to claim 3, wherein the said syrup comprises, in addition, up to 7% by weight relative to the dry matter content of at least one polyol selected from the group consisting of mannitol, xylitol, erythritol, alone or in the form of a mixture with each other.

5. The process according to claim 1, wherein it comprises, in addition, a step for coating the aerated and grained boiled sweet.

6. The process for manufacturing aerated and grained sugar-free boiled sweets according to claim 1, wherein the syrup comprises, relative to the dry matter content, at least 70% by weight of a hydrogenated disaccharide.

7. A aerated and grained sugar-free boiled sweet, wherein said sweet has sweetening dry matter content which comprises at least 60% by weight of a hydrogenated disaccharide.

8. The aerated and grained sugar-free boiled sweet according to claim 7, wherein said sweetening dry matter content comprises at least 70% by weight of a hydrogenated disaccharide.

9. The aerated and grained sugar-free boiled sweet according to claim 7, wherein the said disaccharide is selected from the group consisting of maltitol, lactitol, isomalt, alone or in the form of a mixture with each other.

10. The aerated and grained sugar-free boiled sweet according to claim 9, wherein the said hydrogenated disaccharide is maltitol.

11. The aerated and grained sugar-free boiled sweet according to claim 9, wherein its sweetening dry matter content comprises, in addition, up to 7% by weight of at least one low molecular weight polyol selected from the group consisting of mannitol, xylitol, erythritol, alone or in the form of a mixture with each other.

12. The aerated and grained sugar-free boiled sweet according to claim 11, wherein it comprises a sugar-free crystalline coating obtained by coating.

13. The aerated and grained sugar-free boiled sweet according to claim 7, wherein it comprises, in addition, up to 50% of maltitol syrup dry matter content.

14. The aerated and grained sugar-free boiled sweet according to claim 9, wherein it comprises, in addition, up to 50% of maltitol syrup dry matter content, and wherein its sweetening dry matter content comprises, in addition, up to 7% by weight of at least one low molecular weight polyol selected from the group consisting of mannitol, xylitol, erythritol, alone or in the form of a mixture with each other.

15. The aerated and grained sugar-free boiled sweet according to claim 9, wherein its water content is between 0.5 and 10%.

16. The aerated and grained sugar-free boiled sweet according to claim 7, wherein its sweetening dry matter content comprises, in addition, up to 7% by weight of at least one low molecular weight polyol selected from the group consisting of mannitol, xylitol, erythritol, alone or in the form of a mixture with each other.

17. The aerated and grained sugar-free boiled sweet according to claim 16, wherein it comprises a sugar-free crystalline coating obtained by coating.

18. The aerated and grained sugar-free boiled sweet according to claim 16, wherein its water content is between 0.5 and 10%.

19. The aerated and grained sugar-free boiled sweet according to claim 17, wherein its water content is between 0.5 and 10%.

20. The aerated and grained sugar-free boiled sweet according to claim 7, wherein it comprises, in addition, up to 50% of maltitol syrup dry matter content.

21. The aerated and grained sugar-free boiled sweet according to claim 20, wherein its water content is between 0.5 and 10%.

22. The aerated and grained sugar-free boiled sweet according to claim 7, wherein it comprises, in addition, up to 50% of maltitol syrup dry matter content, and wherein its sweetening dry matter content comprises, in addition, up to 7% by weight of at least one low molecular weight polyol selected from the group consisting of mannitol, xylitol, erythritol, alone or in the form of a mixture with each other.

23. The aerated and grained sugar-free bailed sweet according to claim 22, wherein its water content is between 0.5 and 10%.

24. The aerated and grained sugar-free boiled sweet according to claim 7, wherein its water content is between 0.5 and 10%.

25. The aerated and grained sugar-free bailed sweet according to claim 7, wherein its water content is between 1 and 5%.

* * * * *